(12) United States Patent
Carmina et al.

(10) Patent No.: US 7,034,601 B2
(45) Date of Patent: Apr. 25, 2006

(54) HYBRID INDUCTIVE-CAPACITIVE CHARGE PUMP WITH HIGH DIODE DRIVING CAPABILITY

(75) Inventors: Michele Carmina, Porto Empedocle (IT); Luigi Colalongo, Bologna (IT); Zsolt Miklos Kovacs Vajna, Bologna (IT)

(73) Assignee: STMicroelectronics, S.r.l., (IT)

( * ) Notice: Subject to any disclaimer, the term of this patent is extended or adjusted under 35 U.S.C. 154(b) by 0 days.

(21) Appl. No.: 10/408,210

(22) Filed: Apr. 4, 2003

(65) Prior Publication Data

US 2004/0196094 A1 Oct. 7, 2004

(51) Int. Cl.
*G05F 3/02* (2006.01)

(52) U.S. Cl. .................... 327/536; 327/537; 363/60

(58) Field of Classification Search ............... 327/536, 327/537; 363/59, 60
See application file for complete search history.

(56) References Cited

U.S. PATENT DOCUMENTS

| 3,824,447 | A | * | 7/1974 | Kuwabara | 363/60 |
| 5,081,371 | A | * | 1/1992 | Wong | 327/536 |
| 5,347,171 | A | * | 9/1994 | Cordoba et al. | 327/536 |
| 5,499,183 | A | * | 3/1996 | Kobatake | 363/59 |
| 5,574,634 | A | * | 11/1996 | Parlour et al. | 363/59 |
| 6,278,315 | B1 | * | 8/2001 | Kim | 327/536 |
| 6,515,535 | B1 | * | 2/2003 | Myono | 327/536 |
| 6,781,440 | B1 | * | 8/2004 | Huang | 327/537 |
| 2004/0169547 | A1 | * | 9/2004 | Jones et al. | 327/536 |

* cited by examiner

*Primary Examiner*—Terry D. Cunningham
(74) *Attorney, Agent, or Firm*—Jenkens & Gilchrist, PC

(57) ABSTRACT

A hybrid inductive-capacitive charge pump provided with a driving stage that comprises a step-up converter and a buffer capacitor, and a cascade of charge pump stages; the first stage of the stage cascade is connected to a power supply and the last stage of the stage cascade is connected to an output of the charge pump circuit; the charge pump circuit comprises elements for activating alternately the charge pump stages, transferring charge from one stage of the cascade to the next stage of the cascade, each stage of the cascade of charge pumping stages comprising a pass transistor and a capacitor.

21 Claims, 2 Drawing Sheets

US 7,034,601 B2

HYBRID INDUCTIVE-CAPACITIVE CHARGE PUMP WITH HIGH DIODE DRIVING CAPABILITY

BACKGROUND OF THE INVENTION

The present invention relates to a hybrid inductive-capacitive charge pump with high diode driving capability.

As is known, a charge pump circuit is conventionally provided by means of diode-connected MOS transistors. One significant limitation on the asymptotic voltage reached by an ordinary charge pump circuit provided as described above is due to the loss of a threshold voltage on each one of the MOS transistors that constitute the circuit.

Moreover, the thresholds rise toward the last stages of the circuit, where the voltage between the source and the bulk assumes high values and the body effect becomes more conspicuous.

SUMMARY OF THE INVENTION

The aim of the present invention is to provide a hybrid inductive-capacitive charge pump with high diode driving capability, which allows to avoid the threshold loss that is typical of MOS transistors of known circuits.

Within this aim, an object of the present invention is to provide a hybrid inductive-capacitive charge pump with high diode driving capability that allows to reach high asymptotic output voltages by using a minimal number of stages of the charge pump circuit.

Another object of the present invention is to provide an inductive-capacitive charge pump that allows to reduce the number of boost capacitors to be driven, consequently achieving a reduction in the power in input to the circuit and an increase in efficiency.

A further object of the present invention is to provide a hybrid inductive-capacitive charge pump that allows to drive more than one charge pump by using a single step-up converter.

A still further object of the present invention is to provide a hybrid inductive-capacitive charge pump that allows to optimize the power dissipated by the step-up device.

Another object of the present invention is to provide a charge pump circuit that is highly reliable, relatively simple to manufacture and at competitive costs.

This aim and these and other objects that will become better apparent hereinafter are achieved by a hybrid inductive-capacitive charge pump, characterized in that it comprises a driving stage that comprises a step-up converter and a buffer capacitor, and a cascade of charge pump stages, the first stage of said stage cascade being connected to a power supply and the last stage of said stage cascade being connected to an output of said charge pump circuit, said charge pump circuit comprising means for activating alternately said charge pump stages, transferring charge from one stage of the cascade to the next stage of the cascade, each stage of said cascade of charge pumping stages comprising a pass transistor and a capacitor.

BRIEF DESCRIPTION OF THE DRAWINGS

Further characteristics and advantages of the invention will become better apparent from the description of preferred but not exclusive embodiments of the charge pump circuit according to the present invention, illustrated by way of non-limitative example in the accompanying drawings, wherein.

DESCRIPTION OF THE PREFERRED EMBODIMENTS

Figure 1:
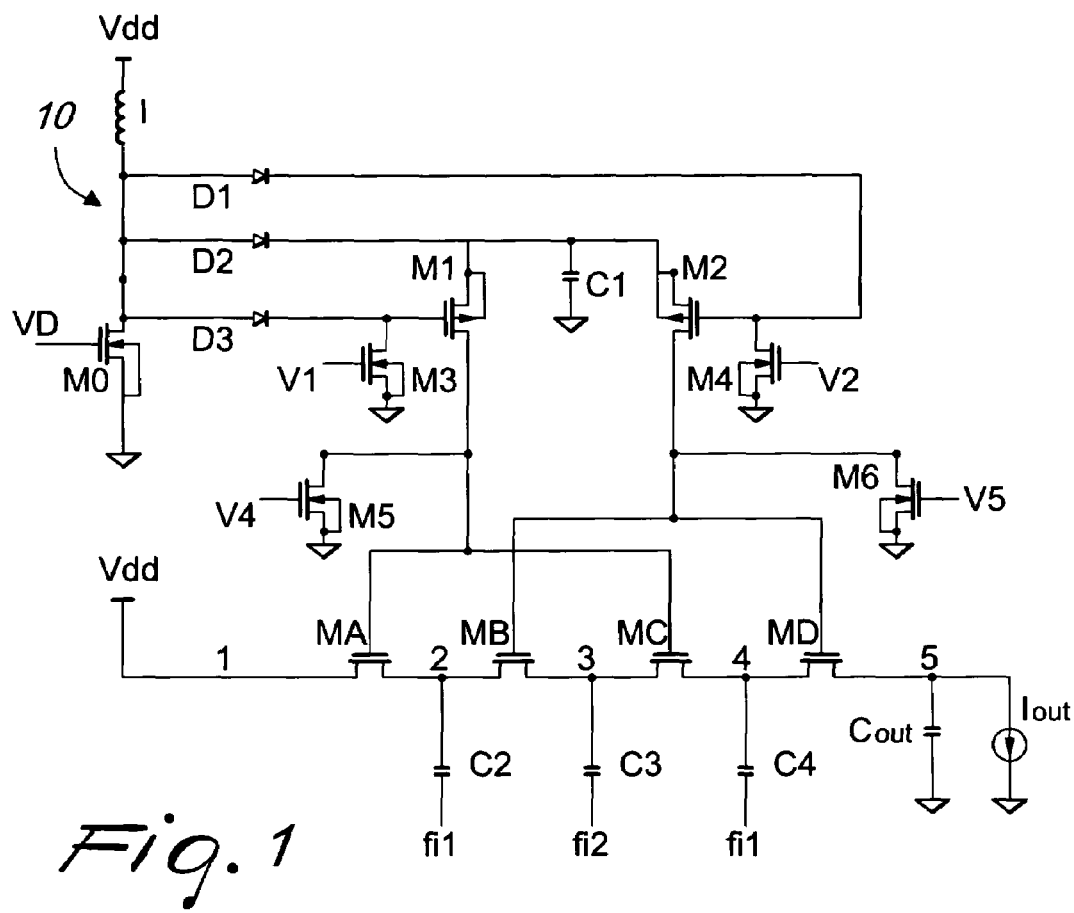
FIG. 1 is a circuit diagram of the circuit according to the present invention.

With reference to the figures cited above, and initially with reference to FIG. 1, the inductive-capacitive charge pump circuit comprises a step-up converter, which comprises a branch designated by the reference numeral 10 in FIG. 1; the converter is mainly composed of an inductor I, which is coupled to the power supply Vdd of the converter and to the drain terminal of a MOS transistor M0 (termed "step-up transistor"). The step-up transistor M0 is of the n-channel type and can be activated by a signal V0 applied to its control terminal (gate terminal).

Figure 3:
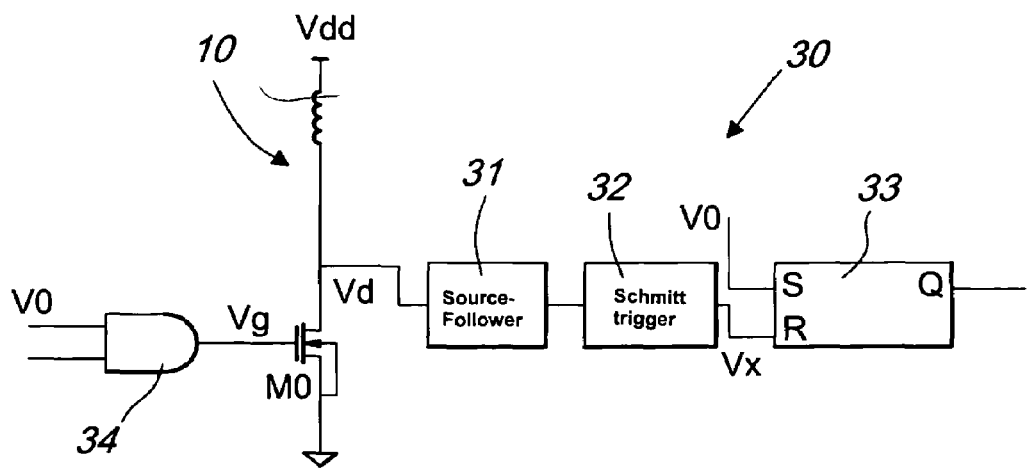
FIG. 3 is a circuit diagram of the automatic adjustment of the step-up device.

The inductive branch 10 of the converter can further comprise means for the automatic adjustment of the power delivered by the circuit, shown in FIG. 3.

The automatic power adjustment means comprise means 30 for reading a voltage of the branch 10 and for switching off the step-up transistor when said voltage exceeds a certain threshold value. In practice, the means 30 consist of a fedback system, which has a source-follower stage 31 for reading the drain voltage of the MOS transistor M0, a Schmitt trigger 32 and a temporary memory 33 for generating an enable signal that is sent to the input and compared with the signal V0 by means of an AND gate 34; the result of the comparison is the signal Vg, which drives the control terminal of the step-up transistor M0.

FIG. 3 shows that the source-follower stage 31, the Schmitt trigger 32, the temporary memory 33 and the AND gate 34 are cascade-connected, and the AND gate 34 comprises in output the control terminal of the step-up transistor M0.

Hereinafter, the expression "conducting terminals" is used to designate equally the source and drain terminals, while the expression "control terminal" is used to designate the gate terminal. As is known, MOS transistors in fact can be activated by increasing the voltage between the gate terminal and the source terminal beyond a certain threshold value, and the conduction of the current that is generated is actually performed by the drain and source terminals.

Again with reference to FIG. 3, the temporary memory 33 preferably consists of a flip-flop SR, the set input of which comprises the signal V0 and the reset input of which comprises the output signal Vx of the trigger 32. The operation of the circuit of FIG. 3 is described hereinafter.

Going back to FIG. 1, the charge pump circuit comprises a cascade of charge pump stages (MA, C2), (MB, C3), (MC, C4), (MD, Cout), each of which comprises a pass transistor and a capacitor. The first stage of the cascade (MA, C2) is connected to a power supply, for example to the power supply Vdd, and the last stage of the cascade (MD, Cout) is connected to an output of the charge pump circuit. The capacitor of the last stage is actually the output capacitor of the circuit, connected to the ground.

Finally, there are means (M1, M2, M3, M4) for activating alternately these charge pumping stages so as to transfer charge from one stage to the next as will become better apparent hereinafter.

The step-up converter comprises first rectifier means (D1, D3) and second rectifier means (D2), in order to allow the flow of the current from the power supply Vdd when the transistor M0 is off. In particular, the first rectifier means comprise diodes D1 and D3 and the second rectifier means comprise a diode D2, which is connected between the inductor I and a buffer capacitor C1 that is connected to the ground.

The diodes D1 and D3, also coupled to the inductor I through their anode terminal, connect the inductor to the control terminal of two switches M1 and M2, preferably of the MOS p-channel type, which are respectively controlled by two additional switches M3 and M4. The pairs of switches (M1, M3) and (M2, M4) each constitute an activation switch for the charge pump.

The activation switches (M1, M3) and (M2, M4) comprise first conducting terminals, which are connected to the step-up converter, and second conducting terminals, which are connected to the buffer capacitor C1. More specifically, the switches M1 and M2 are both connected to the buffer capacitor C1 by virtue of their source terminal.

In the switches M3 and M4, the drain terminals are connected respectively to the gate terminals of the switches M1 and M2 and the source terminal is connected to the ground. The control terminals of the switches M3 and M4 are driven respectively by the activation signals V1 and V2.

The charge pumping stages comprise the elements that actually perform charge pumping; in greater detail, they comprise a plurality of boost capacitors C2, C3 and C4 and a plurality of pass transistors MA, MB, MC, MD, which are coupled in pairs; in particular, MA is coupled to MC and MB is coupled to MD, so that two consecutive pumping stages are connected to different activation switches.

With reference again to FIG. 1, the control terminals of MA and MC are in fact mutually short-circuited and connected to the drain terminal of the switch M1; an exactly equivalent connection is provided between MB and MD and the switch M2.

The first pass transistor MA has a first conducting terminal that is connected to the power supply Vdd, and this connection forms a first node 1 of the charge pump. A second node 2 of the charge pump is instead formed by the connection between the second conducting terminal of the pass transistor MA and a first conducting terminal of the second pass transistor MB.

The second pass transistor MB is connected, by virtue of the second conducting terminal, to the third pass transistor MC so as to form a third node 3, and likewise MC is connected to the fourth pass transistor MD so as to form a fourth node 4.

The fourth pass transistor MD is connected to the output by virtue of the conducting terminal, which is not connected to the node 4. In FIG. 1, the output is represented as an output capacitor $C_{out}$, which is connected in parallel to a current source $I_{out}$; the connection between MD and the output thus forms an output node 5.

Substantially, with the exception of the particular nodes 1 and 5, the nodes are formed by the connection between two consecutive charge pumping stages, so that each node downstream of the power supply is connected to the capacitor of the charge pumping stage located upstream of such node, and so that two consecutive nodes are mutually connected across the conducting terminals of a pass transistor.

The boost capacitors C2, C3 and C4 are therefore connected respectively to the nodes 2, 3 and 4 and are respectively driven by a first phase signal fi1, by a second phase signal fi2, and again by the first phase signal fi1.

The circuit of FIG. 1 is completed by means of the discharge transistors M5 and M6, in which the conducting terminals are connected between the ground and, respectively, the coupled control terminals of MA and MC and of MB and MD. The discharge transistors M5 and M6 are controlled respectively by the discharge signals V4 and V5.

The pass transistors MA, MB, MC and MD are of the n-channel type; moreover, they are of the MOS high-voltage type, and so are the switches M1 and M2 and in general all the transistors that are controlled by high voltages.

Figure 2:
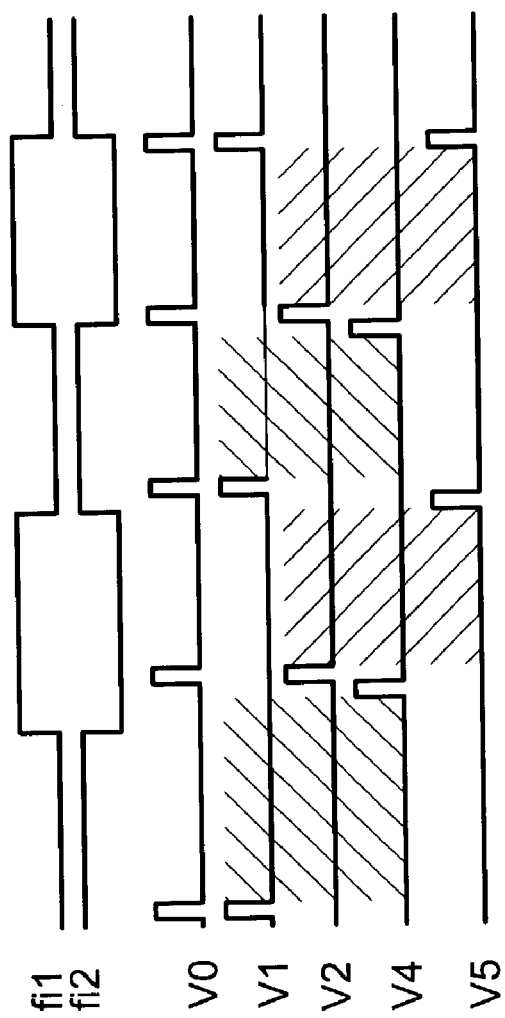
FIG. 2 is a timing chart of the circuit of FIG. 1.

FIG. 2 charts the timings of the circuit of FIG. 1. In particular, it can be noted that the signals V0, V1 and V2 are mutually synchronized and that the clock frequency of the step-up signal V0 is substantially twice the clock frequency of the other two activation signals V1 and V2. The clock pulses of V1 and V2 are offset by half a period, so that when the signal V0 assumes the high value only one of the two signals V1 and V2 assumes the high value.

The phases fi1 and fi2 substantially have the same frequency as the signals V1 and V2, are in phase with them and have a duty cycle of substantially 50%. Moreover, the phases fi1 and fi2 are mutually offset by half a period and are synchronized with the clock pulses of the signal V0.

The discharge signals V4 and V5 instead have substantially the same frequency as the signals V1 and V2, but are time-shifted with respect to the phases fi1 and fi2; in particular, the signals V4 and V5 assume the high value at, respectively, the rising front of the signal fi1 and the rising front of the signal fi2.

Finally, FIG. 2 illustrates, by means of opposite oblique shading, the time intervals during which charge is transferred from the nodes 1 and 3 toward the nodes 2 and 4 and from the nodes 2 and 4 toward the nodes 4 and 5.

With reference to FIGS. 1 and 2, the operation of the circuit is as follows. The switches M1 and M2 are normally off. By means of the diodes D3 and D1, the control terminals of the two switches are in fact periodically brought to the high potential that is present in the buffer capacitor C1, and therefore the voltage is insufficient to ensure that the two switches switch on.

By means of the two switches M3 and M4, the switches M1 and M2 are closed alternately, synchronizing the inputs V0, V1 and V2 so that the clock pulses substantially coincide in time and so that the clock frequency of the signal V0 is twice the clock frequency of the other two signals V1 and V2.

When the phase fi1 assumes the low value, in response to a pulse of the signal V1 the gate charge of the switch M1 is discharged to the ground, thus switching on the switch M1. The charge stored in the buffer capacitor C1 is thus transferred toward the gate terminals of the pass transistors MA and MC, which by activating allow a transfer of charge from the node 1 toward the node 2 and from the node 3 toward the node 4.

When instead the first phase fi1 assumes the high value and the second phase fi2 assumes the low value, following the clock pulse carried by the signal V2 the control terminals of the switches MB and MD are charged, thus switching on said switches and accordingly allowing the transfer of charge from the node 2 to the node 3 and from the node 4 to the output node 5.

At the end of each phase, the transistors that were previously switched on must be switched off, in order to prevent, at the beginning of the next phase, the charge from returning back toward the power supply. For this purpose, the discharge transistors M5 and M6 intervene and lower the potential of the control terminal of the pass transistors at the end of each charge pumping phase when necessary.

The alternating operation of the activation switches (M1, M3) and (M2, M4) described above not only allows to transfer charge from one stage to the other of the pump gradually toward the output, but also allows to keep the buffer capacitor C1 always at the high voltage. The double frequency of the clock signal V0 with respect to the signals V1 and V2 in fact allows to restore on the buffer capacitor C1 the charge lost at each closure of one of the switches M1 and M2.

As is known, the maximum voltage that can be obtained in output from the step-up converter is directly proportional to the inductance of the inductor I and to the maximum current that flows in the step-up transistor M0 when it switches off, and is inversely proportional to the switch-off time.

To achieve higher output levels, it is preferable, for an equal inductance and for equal switching times, to maximize the short-circuit current in the branch 10 composed of an inductor and a step-up transistor M0.

Once this current value has been reached, it is preferable to switch off simultaneously the transistor M0, thus avoiding excessive power dissipations. If the control pulse on the gate terminal of the step-up transistor continued to remain at the high value, the current, having reached its maximum value, would continue to remain constant without increasing the boost effect.

In an alternative embodiment of the invention, the fedback circuit of FIG. 3 is therefore used; said circuit, without additional control signals, is capable of switching off the step-up transistor M0 when the short-circuit condition is reached, creating a sort of enable signal that can "block" the control pulse of the signal V0.

In addition to the current signal that flows through the inductor I, a signal with high information content for managing switch-off timings is the potential of the drain terminal Vd of the transistor M0. When a short-circuit condition is reached and the current on the branch 10 is highest, the drain potential Vd also stabilizes at a constant value that is determined by a supply voltage dividing effect.

The source-follower stage 31 follows the voltage of the drain terminal as long as it remains below the value of the supply voltage, blocking it when the boost effect occurs. This avoids the use of transistors of the high-voltage type in the Schmitt trigger 32, thus allowing to fix the switching level of the trigger; the threshold voltage of the transistors of the high-voltage type would in fact be higher than the drain voltage to which the control signal of the step-up transistor can be brought at the "low" value.

The layout of the Schmitt trigger is the known inverting-type layout. When the signal V0 assumes the high value, a set pulse is sent to the flip-flop: the signal ENABLE in output from the flip-flop reaches the high value, and the potential of the drain terminal reaches a substantially nil value and begins to rise.

Using Vs to designate the drain voltage beyond which the control signal of the step-up transistor can be lowered, this value is made to coincide with the high threshold of the trigger 32.

Once the voltage Vd exceeds Vs, the voltage Vx on the reset terminal of the flip-flop reaches the low value, accordingly lowering the value ENABLE and, by means of the delay along the driver, the transistor M0 is switched off.

It has thus been shown that the described hybrid inductive-capacitive charge pump circuit allows to achieve the intended aim and objects. It has in fact been found that it is possible to reach high asymptotic output voltages by using a minimal number of stages of the charge pump, reducing the number of boost capacitors to be driven and accordingly reducing the power in input to the circuit. The important innovation of the step-up circuit with respect to known uses is due mainly to the absence of a direct current required in output and to the exclusive need to drive a capacitive load: in this manner, it is easier to reach the required voltages with minimal power absorption.

It has also been found that the circuit can be coupled to a fedback circuit in order to optimize the dissipated power by virtue of a control of the duration of the step-up control pulse, which in this manner requires no tuning of any kind to compensate for variations introduced by the process.

The invention thus conceived is susceptible of numerous modifications and variations, all of which are within the scope of the appended claims. For example, with appropriate sizing, it is possible to drive more than one charge pump by using a single step-up converter. In this manner, it is possible to achieve considerable advantages not only in terms of efficiency but also in terms of chip area occupation. The power required in input to the step-up converter in fact remains practically unchanged, while the output currents, which are proportional to the number of charge pumps used, are higher.

In practice, all the details may be replaced with other technically equivalent elements.

What is claimed is:

1. A hybrid inductive-capacitive charge pump circuit, comprising:
    an inductive step-up converter including a buffer capacitor,
    a cascade of charge pump stages, a first stage of said stage cascade being connected to a power supply and a last stage of said stage cascade being connected to an output of said charge pump circuit, and
    means coupled to the inductive step-up converter for activating alternately said charge pump stages, transferring charge from one stage of the cascade to a next stage of the cascade, each stage of said cascade of charge pumping stages comprising a pass transistor and a capacitor,
    wherein the inductive step-up converter comprises an inductor and rectifier circuitry, the rectifier circuitry coupling the inductor to the buffer capacitor and the means for activating.

2. The charge pump circuit according to claim 1, wherein said means for activating alternately said charge pumping stages comprise at least two activation switches, which have first conducting terminals connected to said inductive step-up converter and connected to said buffer capacitor, and have second conducting terminals which are connected to respective stages of said cascade of pumping stages, so that two consecutive pumping stages are connected to different activation switches.

3. The charge pump circuit according to claim 2, comprising a plurality of phase signals for controlling alternately said capacitors of said cascade of pumping stages.

4. The charge pump circuit according to claim 1, wherein the capacitor of said last stage constitutes the output capacitor of said charge pump circuit and is connected to the ground.

5. The charge pump circuit according to claim 1, wherein said cascade of pumping stages comprises a plurality of nodes, a first node being formed by the connection between said power supply and the pass transistor of said first stage of said cascade of pumping stages, an output node being formed by said output, the remaining nodes being formed by the connection between two consecutive pumping stages, so that each node downstream of said power supply is connected to the capacitor of the charge pumping stage that lies upstream of said node and two consecutive nodes are mutually connected by means of the conducting terminals of a pass transistor.

6. The charge pump circuit according to claim 5, wherein each pass transistor comprises a control terminal for activating said pass transistor, so as to transfer charge from one node of said plurality of nodes to the next node, said activation switches being connected to said pumping stages by virtue of said control terminals.

7. The charge pump circuit according to claim 1, wherein said inductive step-up converter comprises a branch that comprises the inductor and a step-up transistor and wherein the rectifier circuitry comprises first rectifier means, which are connected to said means for activating, and second rectifier means, which are connected to said buffer capacitor, said step-up transistor being connected between said inductor and the ground by virtue of its conducting terminals and comprising a step-up control terminal.

8. The charge pump circuit according to claim 7, wherein each one of said activation switches comprises a first p-channel MOS transistor and a second n-channel MOS transistor connected to the ground, said first MOS transistor comprising a gate terminal that is connected to said first rectifier means and to said second transistor, and comprising a source terminal that is connected to said buffer capacitor and to said second rectifier means.

9. The charge pump circuit according to claim 8, wherein the control terminal of said step-up transistor comprises an input receiving a step-up clock signal and said at least two activation switches comprise an input receiving respective activation clock signals, said activation clock signals being synchronized with said step-up clock signal and being offset by half a period, said step-up clock signal having twice the frequency of said activation clock signals.

10. The charge pump circuit according to claim 2, furthermore comprising two discharge switches, which are connected to said pumping stages so as to deactivate the pumping stages that are not activated by said activation switches at the end of each charge pumping phase.

11. The charge pump circuit according to claim 1, wherein said inductive step-up converter comprises a branch which comprises the inductor connected to a step-up transistor and the circuit further comprises means for automatically adjusting power delivered by the inductive step-up converter comprising means for reading a voltage of said branch and for switching off said step-up transistor when said voltage exceeds a threshold value.

12. The charge pump circuit according to claim 11, wherein said means for reading a voltage of said branch and for switching off said inductive step-up transistor when said voltage exceeds a threshold value comprise a source-follower stage, a Schmitt trigger, a flip-flop SR and an AND gate which are cascade-connected, said AND gate comprising in output the control terminal of said step-up terminal, said flip-flop and said AND gate comprising in input the step-up signal, said flip-flop furthermore comprising in input the output signal of said Schmitt trigger and comprising in output an enable signal, said enable signal being in input to said AND gate.

13. The charge pump circuit according to claim 11, wherein said step-up transistor and said pass transistor are n-channel MOS transistors.

14. The charge pump circuit according to claim 10, wherein each said discharge switch is an n-channel MOS transistor.

15. A hybrid inductive-capacitive charge pump circuit, comprising:
a step-up converter including a buffer capacitor,
a cascade of charge pump stages, a first stage of said stage cascade being connected to a power supply and a last stage of said stage cascade being connected to an output of said charge pump circuit, and
means coupled to the step-up converter for activating alternately said charge pump stages, transferring charge from one stage of the cascade to a next stage of the cascade, each stage of said cascade of charge pumping stages comprising a pass transistor and a capacitor,
wherein said step-up converter comprises a branch that comprises an inductor and a step-up transistor and comprises first rectifier means, which are connected to said means for activating, and second rectifier means, which are connected to said buffer capacitor, said step-up transistor being connected between said inductor and the ground by virtue of its conducting terminals and comprising a step-up control terminal.

16. A hybrid inductive-capacitive charge pump circuit, comprising:
a step-up converter including a buffer capacitor,
a cascade of charge pump stages, a first stage of said stage cascade being connected to a power supply and a last stage of said stage cascade being connected to an output of said charge pump circuit, and
means coupled to the step-up converter for activating alternately said charge pump stages, transferring charge from one stage of the cascade to a next stage of the cascade, each stage of said cascade of charge pumping stages comprising a pass transistor and a capacitor,
wherein said step-up converter comprises a branch which comprises an inductor connected to a step-up transistor and the circuit further comprises means for automatically adjusting power delivered by the step-up converter comprising means for reading a voltage of said branch and for switching off said step-up transistor when said voltage exceeds a threshold value.

17. A charge pump circuit, comprising:
an inductive step-up circuit including an inductor and step-up transistor in series;
a rectifying circuit connected to the inductive step-up circuit and a buffer capacitor for generating a control voltage,
a cascade of charge pump stages, and
a switching circuit for alternately activating the charge pump stages with the control voltage.

18. The circuit of claim 17 further including a circuit that automatically adjusts power delivered by the inductive step-up circuit by switching off the step-up transistor if a voltage at the step-up transistor exceeds a threshold value.

19. The circuit of claim 17 wherein the switching circuit includes:
a first p-channel transistor receiving the control voltage at a first conduction terminal and applying the control voltage through a second conduction terminal to certain ones of the charge pump stages, and
a second p-channel transistor receiving the control voltage at a first conduction terminal and applying the control voltage through a second conduction terminal to certain other ones of the charge pump stages.

20. The circuit of claim 19 further including a second rectifying circuit coupled to the inductive step-up circuit for generating gate voltages for the first and second p-channel transistors.

21. The circuit of claim 19 wherein each charge pump stage comprises a pass transistor and a capacitor, a gate of the pass transistor receiving the control voltage from one of the first and second p-channel transistors.

* * * * *